W. GRAY.
AUTOMOBILE CONSTRUCTION.
APPLICATION FILED AUG. 11, 1915.
1,257,340.
Patented Feb. 26, 1918.
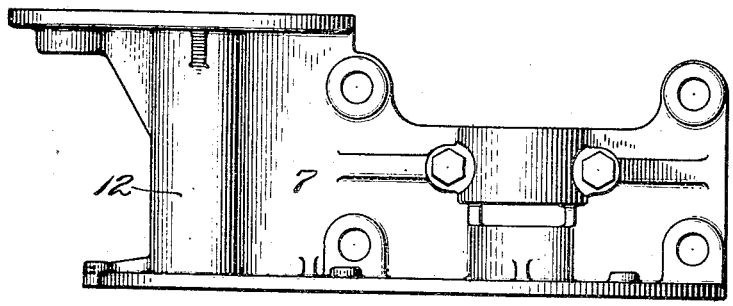
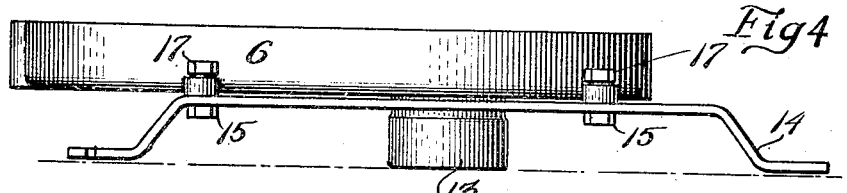
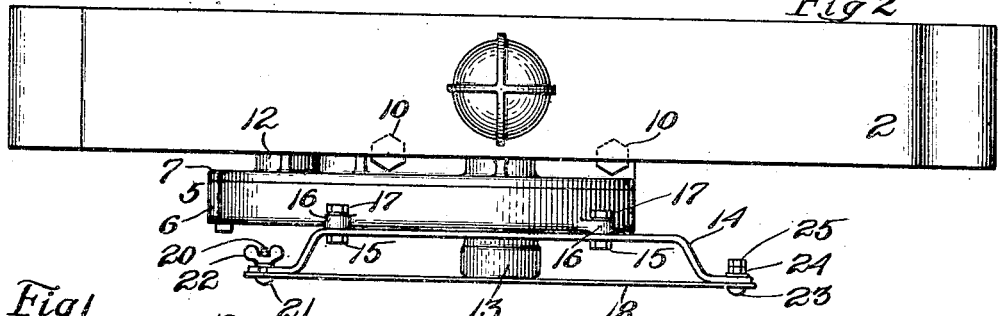
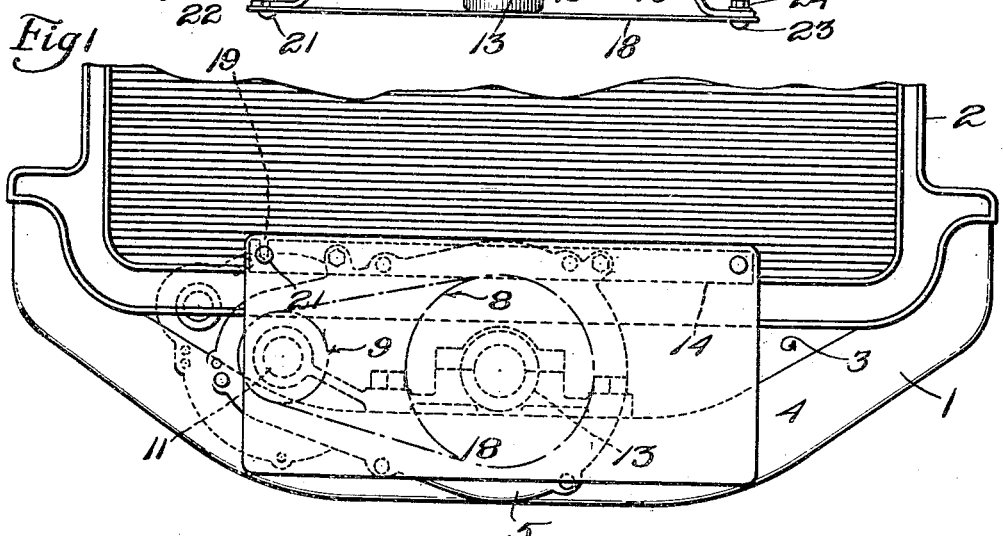
Inventor:
William Gray
by Jesse A. Holton
atty

UNITED STATES PATENT OFFICE.

WILLIAM GRAY, OF BROOKLINE, MASSACHUSETTS, ASSIGNOR TO GRAY & DAVIS INC., OF CAMBRIDGE, MASSACHUSETTS.

AUTOMOBILE CONSTRUCTION.

1,257,340.

Specification of Letters Patent.

Patented Feb. 26, 1918.

Application filed August 11, 1915. Serial No. 44,998.

*To all whom it may concern:*

Be it known that I, WILLIAM GRAY, citizen of the United States, and resident of Brookline, in the county of Norfolk and State of Massachusetts, have invented certain new and useful Improvements in Automobile Constructions, of which the following is a specification.

This invention relates to automobiles and in regard to certain more specific features thereof to the parts which have to do with supporting and displaying the license or registration number plate.

It is one of the objects of the present invention to adapt the license or registration plate carried on each automobile to the useful purposes of obscuring the end of the crank bearing and other parts and preventing the admission thereinto of mud, grease, ice or other foreign elements.

Another object of the invention lies in the provision of simple and inexpensive means for securing the license plate in position.

Still another object is to provide reliable and conveniently operable means whereby the license plate may be adjusted to various positions to obtain access to the cranking mechanism or to obscure and protect the latter as desired.

Other objects will be in part obvious and in part pointed out hereinafter.

The invention accordingly consists in various features of construction, combinations of elements and arrangements of parts which will be exemplified by the construction hereinafter set forth, and the scope of the application of which will be indicated in the following claims.

In the accompanying drawings wherein is shown one of the various possible embodiments of the invention:

Figure 1 is a view in front elevation showing the radiator and parts of the frame of an automobile with the present invention applied.

Fig. 2 is a view of Fig. 1 in top plan.

Figs. 3 and 4 are enlarged views of parts shown in Figs. 1 and 2.

Referring now more particularly to the drawings wherein similar reference characters refer to similar parts throughout the several views, there is indicated at 1 the front cross piece of an automobile frame; the radiator is shown at 2 mounted upon the cross piece, a space 3 being provided between the lower side of the radiator and a belly 4 in the cross piece. Through this space it has been usual to introduce the hand crank or lever to give the crankshaft of the engine its initial turning movement in order to obtain compression of the charge in the engine cylinder. The present embodiment of this invention comprehends the use of an electric motor for the purpose of starting the engine and parts of the transmission between the electric motor and the engine extend through the space between the radiator and cross piece. The device for the transmission of power between the electric motor and the engine comprises driving and driven members and a countershaft, which are housed in the following manner:

A chain and sprocket or gearing case 5 comprises a forward casting 6 and a rearward casting 7 adapted to be joined together to form a housing for the large sprocket 8 and smaller sprocket 9 and a chain connection between the sprockets. The casting 7 is formed with a rearwardly extending horizontal wing or bracket adapted to rest upon the top surface of the front cross piece 1 and be screwed thereto by means of bolts 10 or in any other suitable manner. This rear casting is also preferably provided with a semi-cylindrical portion forming one-half of a split bearing for the transmission shaft between the sprocket 8 and the crankshaft. If desired the crankshaft could be extended and directly connected with the sprocket 8. The small sprocket 9 is secured upon the counter-shaft 11 which is journaled in a bearing 12, the latter forming a part of the casting 7. The forward casting 6 of the chain and sprocket case includes a journal or socket 13 adapted to receive the hand crank when it is desired to start the engine manually, the sprocket 8 may be provided with wrench faces to coöperate with similar faces on the end of the crank and permit rotative engagement of the crank with the sprocket.

Upon the forward face of the casing member 6 there is mounted a strap 14, attachment being made of the strap to the casting by means of bolts 15 passing through the strap 14 and lugs or ears 16 cast with said casing member. Nuts 17 are provided which bring up in the rear of the lugs 16 and hold the strap securely in position. The ends of the strap are bowed forwardly or outwardly to a point very slightly to the rear of the plane of the front face of the hand crank socket 13 and then continue in a parallel plane therewith for a distance suitable to back the number plate 18. One end of the strap 14 is notched as at 19 to receive a shank 20 of a screw 21 which passes through the number plate and has mounted thereon a thumb nut 22 whereby the strap and number plate may be fastened together and separated at will quickly and conveniently. The attachment of the number plate to the opposite end of the strap is of a more permanent character, the screw 23 passing through the plate and strap and the parts being brought together by a nut 24 secured by a check nut 25. The nut 24 is regulated on the screw thread for only slight tension in order that upon loosening the thumb nut 22 the entire number plate may be moved pivotally upon the screw 23 to permit the introduction of the hand crank. If desired, screw 23 might be fashioned with a stud shank thereby obtaining a pre-determined tension.

It is to be noted that the number plate when secured in position is rigidly held against the front flat walls of the ends of the strap and bears firmly against the front face of the socket 13 due to the position of this face of the socket slightly in front of the plane of the flat supporting walls of the strap. This not only maintains the socket tightly closed but also provides and maintains a three point reinforcement of the plate. If desired a flexible packing may be arranged about or within the socket to coöperate with the plate to prevent leakage of oil from the gearing case in the event that oil is used in the bottom of said case to lubricate or quiet the mechanism.

The strap 14 and the number plate are so arranged with respect to the casing that the latter is substantially obscured and the car presents a highly attractive and workmanlike appearance.

Assuming now that the plate is attached as shown in Fig. 1 and it is desired to apply the crank handle for manual operation of the engine shaft the operator, crank in hand, has only to loosen the thumb nut 22 and swing plate about the pivot screw 23 until the plate is suitably free and clear of the path of the crank, thereupon introduce the wrench face end of the crank into the socket 13 which he finds clear of any foreign substance and perform the cranking operation. The hand crank is then removed, the number plate returned and sprung over the socket by tightening the thumb nut 22.

As many changes might be made in the above construction and many apparently widely different embodiments of this invention might be made without departing from the scope thereof it is intended that all matter contained in the above description or shown in the accompanying drawings shall be interpreted as illustrative and not in a limiting sense.

Having described the invention what I desire to secure by Letters Patent is:

1. In apparatus of the character described in combination, an internal combustion engine having a crank shaft, means opposite the end of said crank shaft adapted to receive a crank, and means comprising a pivotally movable number plate adapted normally to bear against and close said first means.

2. In apparatus of the character described, in combination, an internal combustion engine having a crank shaft, an electric motor for starting said engine, a housing for power transmission parts between the motor and engine, a socket member for the reception of a hand crank, and a number plate arranged in front of said housing and said socket member adapted to substantially obscure these parts and prevent the admission of dirt and the like to said socket member.

3. In apparatus of the character described, in combination, an internal combustion engine having a crank shaft, a starting motor for said engine, a housing for power transmission parts between the motor and engine, a socket for the reception of a hand crank, and a number plate arranged in front of said housing and said socket adapted to substantially obscure these parts and prevent the admission of dirt and the like to said socket; said number plate being movable at the will of the operator to permit entry of a hand crank into said socket.

4. In apparatus of the character described, in combination, an engine crank shaft, a housing for power transmission parts extending to said crank shaft, a socket member for the reception of a hand crank, and a number plate arranged in front of said housing and said socket member adapted to substantially obscure these parts and prevent the admission of dirt and the like to said socket member, said number plate being pivotally movable at the will of the operator in a plane transversely of the axis of said socket member to permit entry of a hand crank into said socket member.

5. In apparatus of the character described, in combination, a transmission part casing located in a plane forward of the radiator of an automobile, and a number plate secured in position to obscure said casing.

6. In apparatus of the character described, in combination, a transmission part casing located in a plane forward of the radiator of an automobile, and a number plate secured in position to obscure said casing; said plate being adapted for ready adjustment into another position where it will be out of the path of a member moving transversely into the forward side of the casing.

7. In apparatus of the character described, in combination, a transmission part casing located in a plane forward of the radiator of an automobile, a supporting strap secured to said casing, and a number plate supported by said strap in position to substantially obscure said casing.

8. In apparatus of the character described, in combination, a transmission part casing adapted to be secured to the front cross-piece of an automobile frame and be disposed forwardly of said cross-piece, and means whereby a number plate may be supported forwardly of said casing in position to substantially obscure said casing.

9. In apparatus of the character described, in combination, a transmission part casing adapted to be secured to the front cross-piece of an automobile frame and be disposed forwardly of said cross-piece, and means whereby a number plate may be supported forwardly of said casing in position to substantially obscure said casing, said means permitting movement of the plate to allow a hand crank to be moved transversely toward the front wall of said casing.

10. In apparatus of the character described in combination, a transmission part casing adapted to be secured to the front cross-piece of an automobile frame and be disposed forwardly of said cross-piece, and means comprising a member fixed to said casing whereby a number plate may be supported forwardly of said casing in position to substantially obscure said casing.

11. In apparatus of the character described, in combination, a transmission part casing adapted to be secured to the front cross-piece of an automobile frame and be disposed forwardly of said cross-piece, and means comprising a member fixed to said casing whereby a number plate may be supported forwardly of said casing in position to substantially obscure said casing, said means permitting movement of the plate to allow a hand crank to be moved transversely toward the front wall of said casing.

12. In apparatus of the character described, in combination, a transmission part casing adapted to be attached to and project forwardly of a front cross-piece of an automobile frame, means comprised by said casing for receiving a hand crank, and means whereby a number plate may be attached to said casing to substantially obscure the latter.

13. In apparatus of the character described, in combination, a transmission part casing adapted to be attached to and project forwardly of a front cross-piece of an automobile frame, means comprised by said casing for receiving a hand crank, and means whereby a number plate may be attached to said casing to substantially obscure the latter and to bear firmly against the first said means to prevent the admission of dirt and the like.

14. In apparatus of the character described, in combination, a transmission part casing adapted to be attached to and project forwardly of a front cross-piece of an automobile frame, means comprised by said casing for receiving a hand crank, and means whereby a number plate may be attached to said casing to substantially obscure the casing and to bear firmly against the first said means to prevent the admission of dirt and the like, said last means causing a slightly abnormal pressure of the plate on said first means.

15. In apparatus of the character described, in combination, a transmission part casing comprising means adapted to support a strap, a strap attached to said means, said strap having its ends lying in a plane forward of the plane of its body, a member projecting from the forward side of said casing adapted to receive a wrench and having a forward open face in a plane slightly forward of the plane of the strap ends, and means at each strap end for securing a number plate so that said plate will substantially obscure the casing and press against the wrench receiving member.

16. In apparatus of the character described, in combination, a transmission part casing comprising means adapted to support a strap, a strap attached to said means, said strap having its ends lying in a plane forward of the plane of its body, a member projecting from the forward side of said casing adapted to receive a wrench and having a forward open face in a plane slightly forward of the plane of the strap ends, and means at each strap end for securing a number plate so that said plate will substantially obscure the casing and press against the wrench receiving member, the last said means being adjustable to permit pivotal movement of the plate relatively to one end of said strap.

17. In apparatus of the character described, in combination, an engine having a crank shaft, a socket member for the reception of a hand crank, and means, comprising a member in fixed relation with said engine, for supporting a number plate in position to bear against and close said socket.

18. In apparatus of the character described, in combination, an engine having a crank shaft, a socket member for the reception of a hand crank, and means, comprising a member in fixed relation with said engine, for supporting a number plate in position to bear against and close said socket, said means having provision for pivotal movement of said number plate thereon in a direction substantially at a right angle to the direction of introduction of said hand crank to said socket.

Signed at Cambridge in the county of Middlesex and State of Massachusetts this 2nd day of August A. D. 1915.

WILLIAM GRAY.

Copies of this patent may be obtained for five cents each, by addressing the "Commissioner of Patents, Washington, D. C."